United States Patent
Tseng et al.

(10) Patent No.: US 10,257,383 B2
(45) Date of Patent: Apr. 9, 2019

(54) IMAGE PROCESSING APPARATUS WITH PARTITION IMAGE PROCESSING FUNCTION

(71) Applicant: AVISION INC., Hsinchu (TW)

(72) Inventors: Cheng Chen Tseng, Hsinchu County (TW); Chen-Chang Li, Miaoli County (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 15/630,398

(22) Filed: Jun. 22, 2017

(65) Prior Publication Data
US 2018/0013918 A1 Jan. 11, 2018

(30) Foreign Application Priority Data
Jul. 6, 2016 (TW) .............................. 105121314 A (51) Int. Cl.
*H04N 1/32* (2006.01)
*H04N 1/387* (2006.01)
*H04N 1/409* (2006.01)
*G06F 3/12* (2006.01)
*G06K 15/02* (2006.01)

(52) U.S. Cl.
CPC ....... *H04N 1/3876* (2013.01); *H04N 1/32133* (2013.01); *H04N 1/4092* (2013.01); *H04N 2201/0094* (2013.01)

(58) Field of Classification Search
None
See application file for complete search history.

(56) References Cited

U.S. PATENT DOCUMENTS

| 5,696,842 A * | 12/1997 | Shirasawa | H04N 1/41 358/462 |
|---|---|---|---|
| 6,519,364 B1 | 2/2003 | Hiraishi | |
| 6,751,779 B1 | 6/2004 | Kurosawa et al. | |
| 8,196,836 B2 * | 6/2012 | Usuba | G06K 7/10 235/435 |
| 2002/0196979 A1 * | 12/2002 | Yen | G06K 7/14 382/190 |

(Continued)

FOREIGN PATENT DOCUMENTS

| CN | 102708552 A | 10/2012 |
|---|---|---|
| CN | 103927765 A | 7/2014 |

(Continued)

*Primary Examiner* — Beniyam Menberu (57) ABSTRACT

An image processing apparatus includes an image processing device. The image processing device includes a receiving port and a processor connected together. The receiving port receives old image data corresponding to a document image of a document. The processor divides the old image data into first area image data corresponding to a first area image of the document, and second area image data corresponding to a second area image of the document, and further performs image enhancement processing on the first area image data to obtain enhanced first area image data. Thus, the first area image may be separated from the second area image, and the image enhancement processing is performed on the first area image. The enhanced first area image data and the second area image data are separately outputted or combined for output.

1 Claim, 7 Drawing Sheets

(56) References Cited

U.S. PATENT DOCUMENTS

| | | | |
|---|---|---|---|
| 2003/0107781 A1* | 6/2003 | Ozawa | H04N 1/3871 358/506 |
| 2004/0099741 A1* | 5/2004 | Dorai | G06K 7/14 235/462.08 |
| 2005/0175256 A1* | 8/2005 | Yokouchi | G06T 11/60 382/276 |
| 2006/0291732 A1* | 12/2006 | Bai | H04N 1/40062 382/239 |
| 2007/0127056 A1* | 6/2007 | Hirano | G03G 21/04 358/1.14 |
| 2009/0207269 A1* | 8/2009 | Yoda | G06T 11/60 348/222.1 |
| 2009/0285505 A1* | 11/2009 | Mihara | H04N 1/3935 382/284 |
| 2010/0007597 A1* | 1/2010 | Lee | G09G 3/3648 345/99 |
| 2010/0214620 A1* | 8/2010 | Ishiguro | H04N 1/40062 358/3.28 |
| 2011/0102853 A1* | 5/2011 | Makishima | H04N 1/00864 358/3.28 |
| 2012/0154520 A1* | 6/2012 | Putraya | G06T 3/4038 348/36 |
| 2012/0268764 A1 | 10/2012 | Sheng | |
| 2013/0222857 A1* | 8/2013 | Nobushima | G06K 15/1848 358/1.18 |
| 2015/0237232 A1 | 8/2015 | Sheng et al. | |
| 2016/0203617 A1* | 7/2016 | Murahashi | G06F 3/1446 345/589 |

FOREIGN PATENT DOCUMENTS

| | | | | |
|---|---|---|---|---|
| JP | 2000-048191 | * | 2/2000 | G06T 5/00 |
| JP | 2001-144943 | * | 5/2001 | H04N 1/387 |
| TW | 356544 | | 4/1999 | |
| TW | 200731162 A | | 8/2007 | |
| TW | 201242791 A | | 11/2012 | |
| TW | 201448561 A | | 12/2014 | |
| TW | 201532851 A | | 9/2015 | |

* cited by examiner

IMAGE PROCESSING APPARATUS WITH PARTITION IMAGE PROCESSING FUNCTION

This application claims priority of No. 105121314 filed in Taiwan R.O.C. on Jul. 6, 2016 under 35 USC 119, the entire content of which is hereby incorporated by reference.

BACKGROUND OF THE INVENTION

Field of the Invention

This disclosure relates to an image processing apparatus and an image processing method, and more particularly to an image processing apparatus and an image processing method with partition image processing functions.

Description of the Related Art

When a conventional copier is performing copying, the copier scans an original to obtain a scanned result, and then reproduces the scanned result on a medium. Outer-ring portions of some originals are printed with barcodes, institution names or codes for recording information such as sources or copy history records of these originals. More particularly, these history records will be encoded again in the next copy, and then printed on the outer-ring portions of the reproduced documents. Thus, the inner ring image and the outer ring image have different qualities in thickness of lines, shading, miscellaneous points or the like on the reproduced document reproduced after multiple generations of copying processes. Thus, the inner ring image looks very old, and the outer ring image looks very new and cannot match with the inner ring image. This also brings the trouble to the user.

SUMMARY OF THE INVENTION

It is therefore an object of this disclosure to provide an image processing apparatus and an image processing method with partition image processing functions, so that the image processing apparatus can enhance a first area image into an enhanced first area image for output.

To achieve the above-identified object, this disclosure provides an image processing apparatus comprising an image processing device. The image processing device comprises: a receiving port receiving old image data corresponding to a document image of a document; and a processor, which is connected to the receiving port, divides the old image data into first area image data corresponding to a first area image of the document, and second area image data corresponding to a second area image of the document while keeping the second area image data, and a corresponding relationship between the second area image data and the first area image data, and performs image enhancement processing on the first area image data to obtain enhanced first area image data.

This disclosure further provides an image processing method used in an image processing apparatus. The image processing method comprises steps of: scanning a document to obtain old image data corresponding to a document image of the document; and dividing the old image data into first area image data corresponding to a first area image of the document, and second area image data corresponding to a second area image of the document while keeping the second area image data, and a corresponding relationship between the second area image data and the first area image data, and performing image enhancement processing on the first area image data to obtain enhanced first area image data.

With the above-mentioned aspects, the first area image may be separated from the second area image, the image enhancement processing is performed on the first area image, and the enhanced first area image and the second area image are separately outputted or combined for output. The cloud server or the local processor can recognize or encode the second area image into an encoded second area image, which is printed on the medium. It is also possible to calibrate the position of the first area image according to the recognized second area image and then print the position-calibrated first area image and the second area image on the medium. Consequently, the printed medium is free from the blurry or unclear first area image after multiple generations of copying processes, and the uniform copy medium can be provided to the user.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

This disclosure will be apparent from the following detailed description, which proceeds with reference to the accompanying drawings.

Referring to FIGS. 1 to 5, this embodiment provides an image processing apparatus 1 comprising an image processing device 200. The image processing device 200 comprises a receiving port 210, a processor 220, a storage 230 and an output port 240. The processor 220 is connected to the receiving port 210, the storage 230 and the output port 240. The image processing device 200 comprises, for example but without limitation, a processor of a computer, a server or a multi-function peripheral. This technical field pertains to the image processing and recording and is applicable to information file processing, such as file copier, a peripheral, a scanner or the like. When the image processing apparatus 1 is an independent multi-function peripheral, it may further comprise a peripheral device 100. The peripheral device 100 comprises a scanner (e.g., a scanner having an automatic document feeder), a printer and a corresponding control processing module. The peripheral device 100 comprises a scanner for performing image acquiring on a document D or scanning the document D to obtain old image data ID1 corresponding to a document image DI of the document D.

Figure 1:
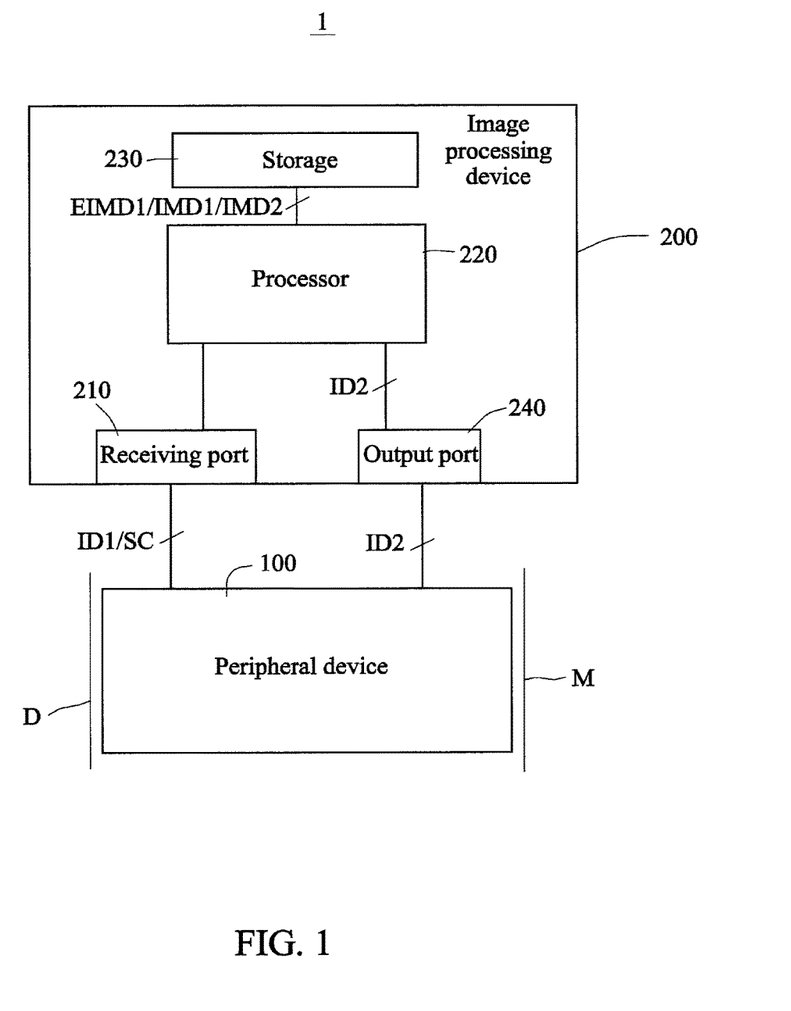
FIG. 1 is a schematic view showing an image processing apparatus according to a preferred embodiment of this disclosure.
Figure 3:
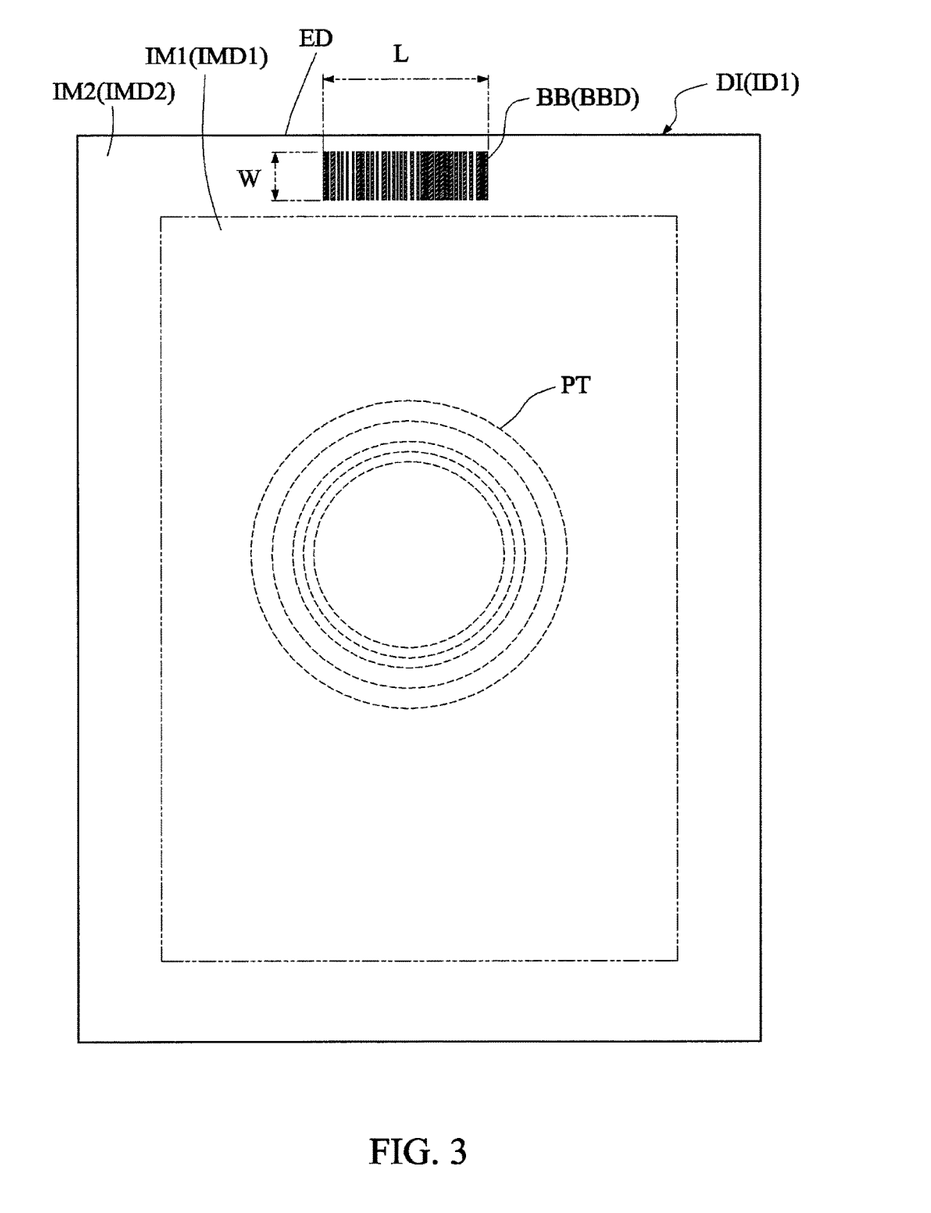
FIG. 3 is a schematic view showing old image data.

The processor 220 of the image processing device 200 is connected to the peripheral device 100 through the receiving port 210 and the output port 240, receives the old image data ID1 through the receiving port 210, and divides the old image data ID1 into first area image data IMD1 corresponding to a first area image IM1 of the document D, and second area image data IMD2 corresponding to a second area image IM2 of the document D while keeping the second area image data IMD2, and the corresponding relationship between the second area image data IMD2 and the first area image data IMD1 (e.g., the relationships regarding inner and outer portions, wherein the outer portion surrounds the inner portion). The image data may be stored in the storage 230, which may be implemented using a hard disk drive, an optical disk drive, a magnetic tape drive or the like.

It is worth noting that the peripheral device 100 may also output a first-area image processing requirement signal SC, which is not the essential signal. The image processing device 200 is requested to enter the first area processing mode to perform the following processing upon receipt of the first-area image processing requirement signal SC. Each of the receiving port 210 and the output port 240 may be the interface, such as USB interface, network interface or the like, which can achieve the electrical connection, or an ordinary direct electrical connection interface (direct bonding or the connection through electrical connectors).

Figure 2:
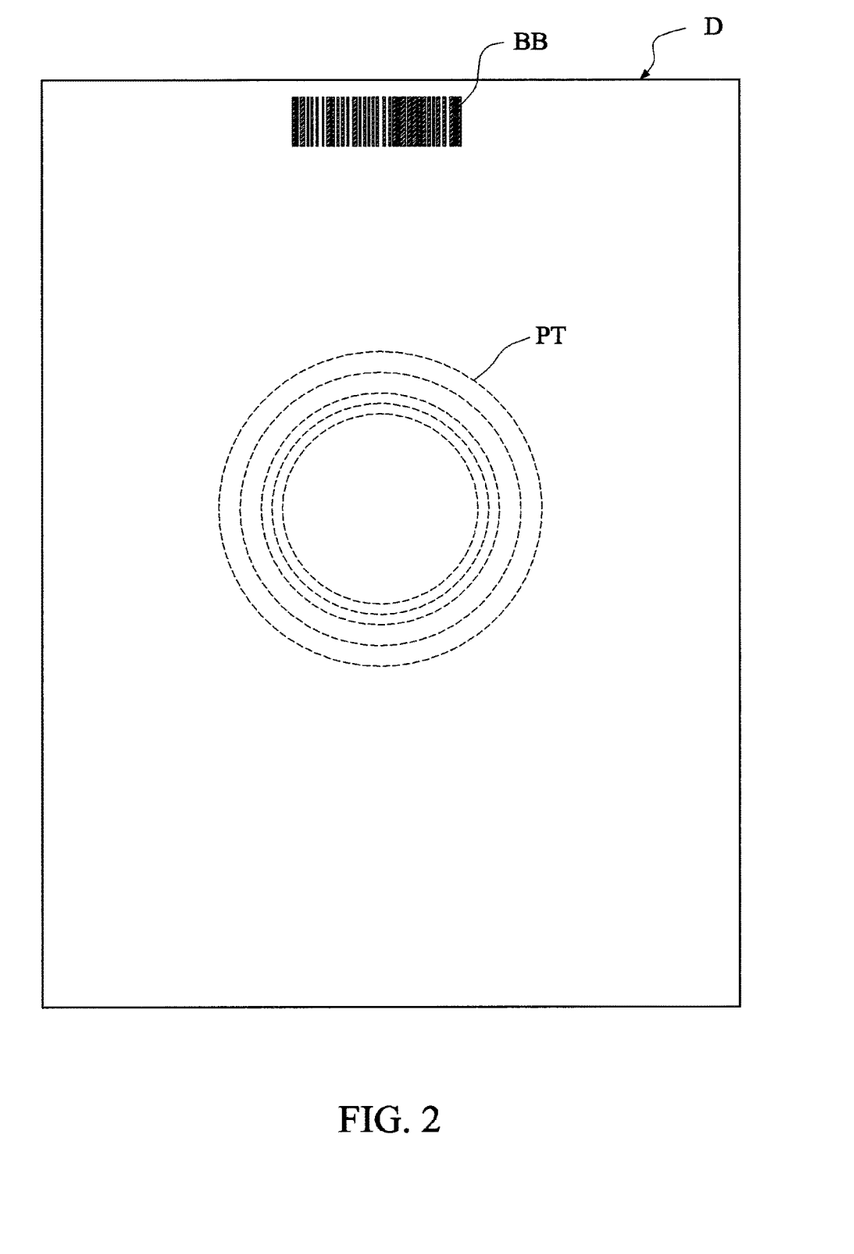
FIG. 2 is a schematic view showing an original document.

In this embodiment, the second area image IM2 surrounds the first area image IM1, and the first area image IM1 has a rectangular shape. In another embodiment, the first area image IM1 has an elliptical or circular shape, and is applicable to the scan and copy processes for a circular or elliptical original.

Next, the image processing device 200 performs image enhancement processing on the first area image data IMD1 to obtain enhanced first area image data EIMD1. Herein, the image enhancement processing is selected from a group consisting of image inpainting, color enhancing, contrast enhancing, brightness enhancing and miscellaneous point removing.

Figure 4:
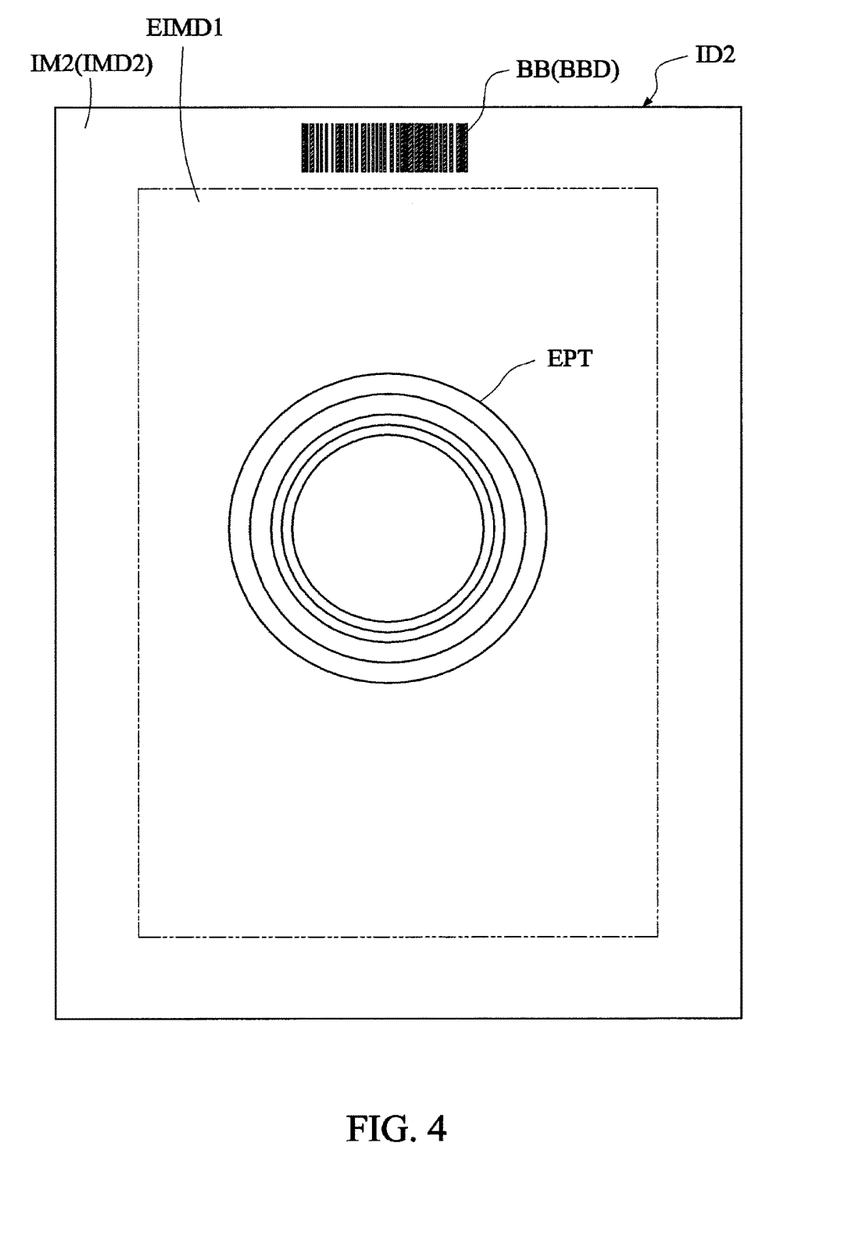
FIG. 4 is a schematic view showing new image data.
Figure 5:
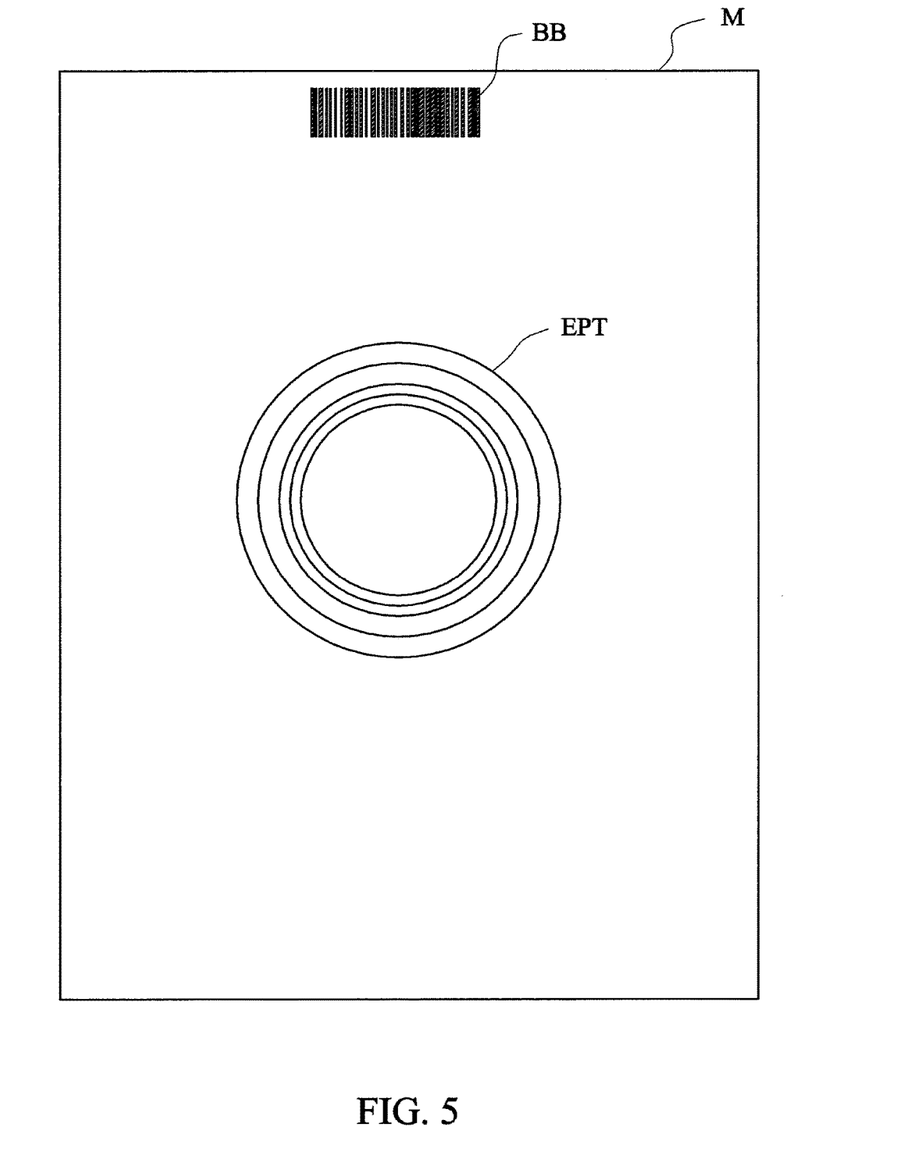
FIG. 5 is a schematic view showing a reproduced medium.

In a first mode, the image processing device 200 further combines the enhanced first area image data EIMD1 with the second area image data IMD2 to generate new image data ID2 according to the corresponding relationship. The peripheral device 100 may further comprise a printing module (e.g., a printer), which receives the new image data ID2 and prints the new image data ID2 on a medium M. In addition, the new image data ID2 may be outputted to a cloud server through the output port 240, and the cloud server performs the further processing, such as performing a re-encoding process or a position calibrating process, according to the second area image data.

In a second mode, the image processing device 200 outputs the second area image data IMD2, the enhanced first area image data EIMD1 and the corresponding relationship to the cloud server through the output port 240, and the cloud server performs the further processing, such as performing a re-encoding process, according to the second area image data. In addition, the second area image data IMD2 is outputted before the enhanced first area image data EIMD1 is outputted, and the image enhancement processing starts in the period of outputting the second area image data IMD2, so that the time can be effectively used to perform the image enhancement of the first area and the barcode decoding and encoding processes of the second area.

Partitioning the first area image and the second area image can be implemented through the following methods, for example. First, the image processing device 200 seeks a barcode block data BBD corresponding to a barcode block BB from the old image data ID1. Then, a width W and a length L of the barcode block BB are calculated. Next, the second area image IM2 is defined according to a smaller one of the width W and the length L of the barcode block BB. In FIG. 3, the image processing device 200 gradually seeks the barcode block BB from an edge or edges ED of the document image DI. For example, the seeking starts from top, bottom, left and right edges ED to the first area in a pixel-by-pixel manner. When the boundary of the barcode block BB is found, the width W and the length L may be determined. Because the width W is smaller than the length L, the width W plus a predetermined distance (or pixel count) is taken, and the overall edges ED are shifted inward by the width W plus the predetermined distance (or pixel count) to partition the document image DI into the first area image and the second area image. Alternatively, partitioning of the first area image and the second area image may also be assisted by way of character or text recognition.

It is worth noting that the image processing device 200 and the peripheral device 100 may be implemented separately, or may be integrated into an integrated image processing device 1, which may also be referred to as a copy apparatus or copier. That is, the image processing device 200 and the peripheral device 100 are disposed in a casing of the image processing apparatus 1, and the associated data or records may be only stored in the image processing apparatus 1, or transmitted to the cloud apparatus through the network.

In addition, this embodiment also provides an image processing method used in an image processing apparatus. The image processing method comprises the following steps. First, the document D is scanned to obtain the old image data ID1 corresponding to the document image DI of the document D. Next, the old image data ID1 is divided into the first area image data IMD1 corresponding to the first area image IM1 of the document D, and the second area image data IMD2 corresponding to the second area image IM2 of the document D, and the image enhancement processing is performed on the first area image data IMD1 to obtain the enhanced first area image data EIMD1. Of course, it is also possible to combine the enhanced first area image data EIMD1 with the second area image data IMD2 to generate the new image data ID2. Then, the new image data ID2 is printed on the medium M.

For example, an original pattern PT of the document D of FIG. 2 is blurry and unclear, and the printed enhanced pattern EPT is very clear after the processing of this embodiment. However, the barcode block BB is not affected at all because the barcode block BB has to be faithfully kept to prevent the entire barcode block BB from becoming a black block after the enhancement process, wherein the black block disables the subsequent processes from being performed.

In another embodiment, the processor 220 may recognize the old encoded pattern (e.g., the barcode pattern) of the second area image IM2 to generate a recognized result (e.g., the information of the recognized barcode pattern containing the generation-count information of the copy) according to the second area image data IMD2. Then, the processor 220 generates a new encoded pattern (e.g., a new barcode pattern containing the information of the copier (person), the information of the copy date, the information of the copy count, the new generation-count information representing that the reproduced document is a third generation of reproduced document reproduced from the second generation of reproduced document, for example, or the like) different from the old encoded pattern according to the recognized result. In this case, the image processing device 200 may further combine the enhanced first area image data EIMD1 with the new encoded pattern to generate the new image data ID2 according to the corresponding relationship, so that the peripheral device 100 prints the combined result onto the medium M. Consequently, the image processing apparatus 1 can finish the image enhancing and encoded pattern recognizing processes, and the work of printing out.

Figure 6:
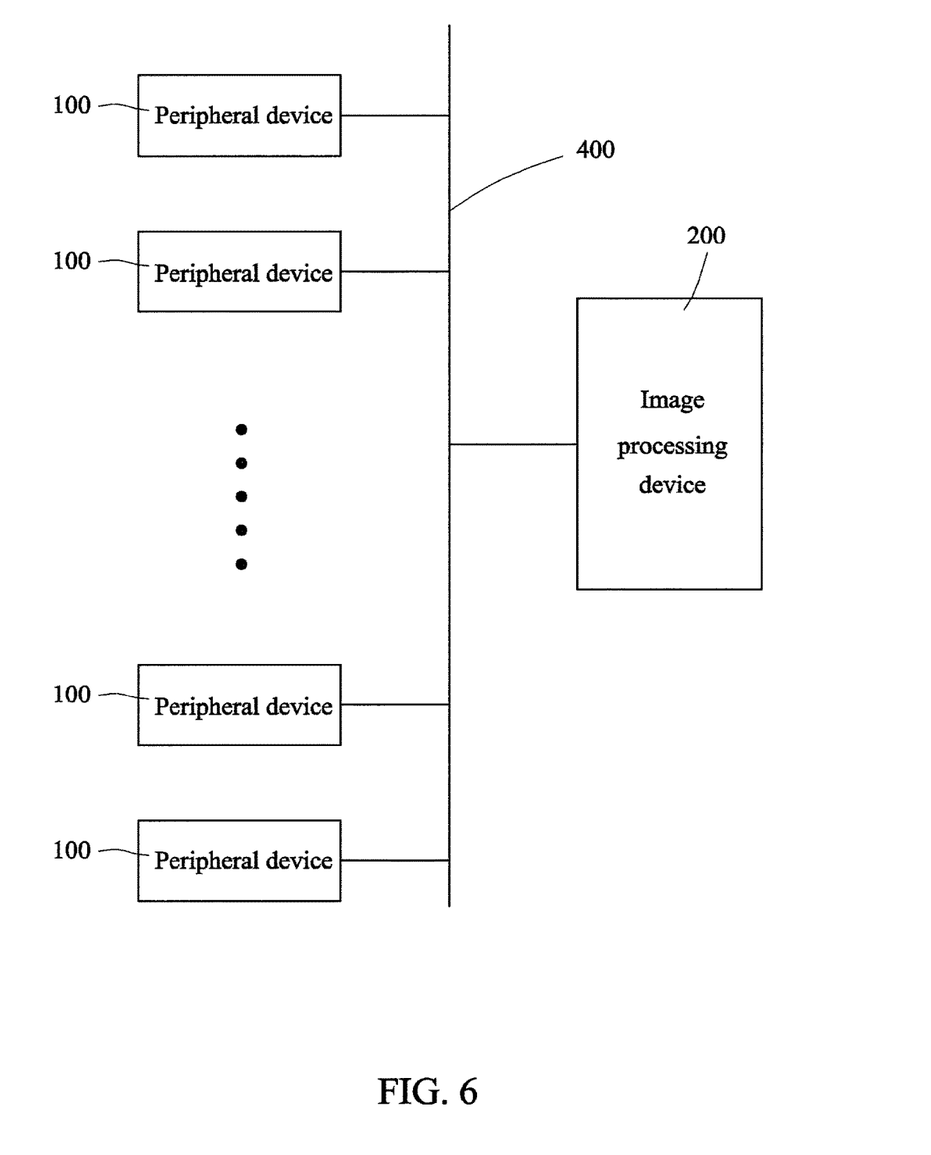
FIG. 6 is a schematic view showing a copy system according to the preferred embodiment of this disclosure.

FIG. 6 is a schematic view showing a copy system according to the preferred embodiment of this disclosure. The image processing method may also be applied to a copy system. As shown in FIG. 6, multiple peripheral devices 100 are connected to the image processing device 200, which may be regarded as a cloud server, through the network 400. The copy operation of each peripheral device 100 is controlled, recorded and processed by the image processing device 200. So, in this example, the peripheral device 100 outputs the new image data to the image processing device 200, which processes the new image data and into the processed new image data transmitted back to the peripheral device 100, and the peripheral device 100 prints out the processed new image data.

Figure 7:
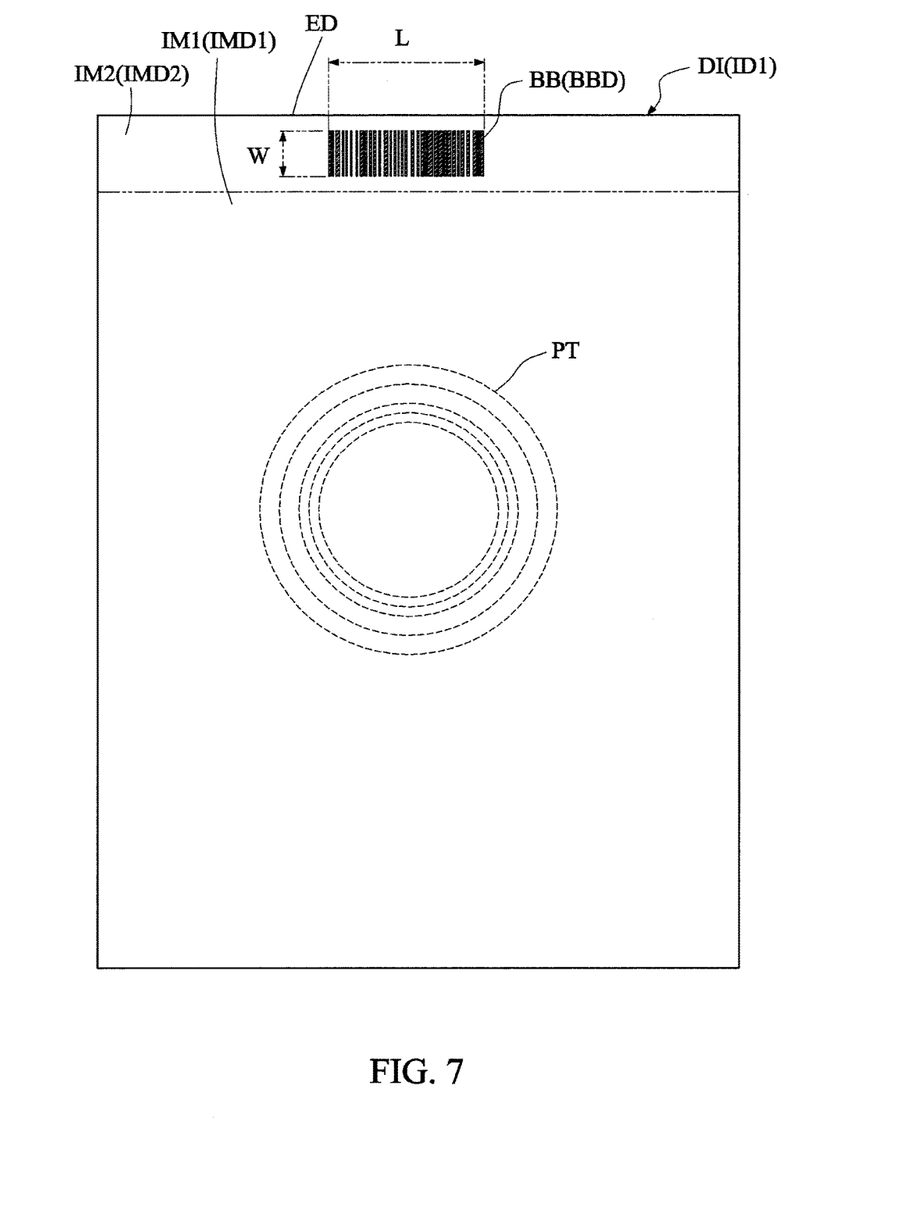
FIG. 7 is a schematic view showing image partitioning according to another embodiment of this disclosure.

FIG. 7 is a schematic view showing image partitioning according to another embodiment of this disclosure. As shown in FIG. 7, the partitioning of this embodiment is similar to the above-mentioned embodiment except for the difference that the document image DI is partitioned into a first area image IM1 pertaining to a lower area image, and a second area image IM2 pertaining to an upper area image. The processor may be configured to partition the document image into the upper and lower portions when only one barcode block is detected. In another example, the middle portion of the document image may be defined as the first area image, and the upper and lower portions of the document image may be defined as the second area image when the upper barcode block and the lower barcode block are detected. In still another example, the lower left portion of the document image may be defined as the first area image, and the upper right portion of the document image (inverse-L shaped portion) is defined as the second area image when the upper barcode block and the right barcode block are detected. Of course, these are only for the illustrative purposes only, and do not intent to restrict this disclosure thereto.

With the above-mentioned embodiments, the first area image may be separated from the second area image, the image enhancement processing is performed on the first area image, and the enhanced first area image and the second area image are separately outputted or combined for output. The cloud server or the local processor can recognize or encode the second area image into an encoded second area image, which is printed on the medium. It is also possible to calibrate the position of the first area image according to the recognized second area image and then print the position-calibrated first area image and the second area image on the medium. Consequently, the printed medium is free from the blur or unclear first area image after multiple generations of copying processes, and the uniform copy medium can be provided to the user.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. An image processing apparatus, comprising:
an image processing device comprising: a receiving port, which is connected to a peripheral device and receives old image data corresponding to a document image of a document; a processor, which is connected to the receiving port, divides the old image data into first area image data corresponding to a first area image of the document, and second area image data corresponding to a second area image of the document while keeping the second area image data separated from the first area image data, and keeping a corresponding relationship between the second area image data and the first area image data, and performs image enhancement processing on only the first area image data separated from the second area image data to obtain enhanced first area image data representative of an image clearer than the first area image without affecting the second area image data before the enhanced first area image data is combined with the second area image data; and an output port, which is connected to the peripheral device or a second peripheral device and outputs the second area image data, the enhanced first area image data and the corresponding relationship,
wherein the second area image data is outputted from the output port before the enhanced first area image data is outputted from the output port, and the image enhancement processing starts in a period of outputting the second area image data from the output port.

* * * * *